(12) United States Patent
Gold

(10) Patent No.: US 10,780,820 B1
(45) Date of Patent: Sep. 22, 2020

(54) VEHICLE DOOR PILLAR LIGHT ASSEMBLY AND METHOD OF USE THEREOF

(71) Applicant: Inview Vehicle Trim Corp., Rockville Center, NY (US)

(72) Inventor: Peter Gold, Rockville Centre, NY (US)

(73) Assignee: Inview Vehicle Trim Corp., Rockville Center, NY (US)

(*) Notice: Subject to any disclaimer, the term of this patent is extended or adjusted under 35 U.S.C. 154(b) by 0 days.

(21) Appl. No.: 16/420,462

(22) Filed: May 23, 2019

(51) Int. Cl.
| | |
|---|---|
| *B60Q 1/26* | (2006.01) |
| *B60Q 1/32* | (2006.01) |
| *B62D 25/04* | (2006.01) |
| *F21V 23/04* | (2006.01) |
| *G08B 5/38* | (2006.01) |
| *F21Y 115/10* | (2016.01) |

(52) U.S. Cl.
CPC ............. *B60Q 1/323* (2013.01); *B62D 25/04* (2013.01); *F21V 23/0471* (2013.01); *G08B 5/38* (2013.01); *B60Q 2400/40* (2013.01); *F21Y 2115/10* (2016.08)

(58) Field of Classification Search
CPC .... B60Q 1/323; B60Q 2400/40; B62D 25/04; F21V 23/0471; G08B 5/38; F21Y 2115/10
USPC ......................................................... 340/468
See application file for complete search history.

(56) References Cited

U.S. PATENT DOCUMENTS

| | | | | |
|---|---|---|---|---|
| 4,823,239 A | * | 4/1989 | Doty ....................... | B60R 22/34 362/234 |
| 5,206,562 A | * | 4/1993 | Matsuno ................ | B60Q 1/323 307/10.8 |
| 5,398,453 A | * | 3/1995 | Heim ....................... | B60J 5/042 49/502 |
| 6,092,865 A | | 7/2000 | Jaekel et al. | |
| 6,899,374 B1 | * | 5/2005 | Heard ....................... | B60J 5/047 296/155 |
| 8,382,350 B2 | | 2/2013 | Gold | |
| 8,596,840 B2 | | 12/2013 | Gold | |
| 8,894,256 B2 | | 11/2014 | Gold | |
| 9,108,569 B2 | | 8/2015 | Gold | |

(Continued)

OTHER PUBLICATIONS

Gold, Peter, Petition for Rulemaking to National Highway Traffic Safety Administration, Mar. 11, 2019, https://img1.wsimg.com/blobby/go/7e7471d2-d35b-4c39-976e-be48a0592c47/downloads/Petition%20for%20Rulemaking%20final%2010-11-2019.pdf?ver=1553698718999.

*Primary Examiner* — Kerri L McNally
*Assistant Examiner* — Thang D Tran
(74) *Attorney, Agent, or Firm* — Schwegman Lundberg & Woessner, P.A.

(57) ABSTRACT

A vehicle door pillar light assembly for illuminating a vehicle door and a method of warning drivers of vehicles, having a vehicle door frame defining an opening for entering and exiting a vehicle, a door hingedly connected to the frame and moveable between open and closed positions, and a device for detecting whether the door is open or closed. The assembly further includes a light mounted within the door frame which is electrically connected to the device for detecting whether the door is open or closed. The light is illuminated when the door is opened and unilluminated when the door is closed. When the light source is positioned on the rear of the door frame, it illuminates the vehicle door and objects disposed between the light source and the, when the door is in the open positions, in order to increase the conspicuity of the opened door.

15 Claims, 6 Drawing Sheets

(56) References Cited

U.S. PATENT DOCUMENTS

| | | | | |
|---|---|---|---|---|
| 9,308,859 B2* | 4/2016 | Gold | | B60Q 1/323 |
| 9,469,246 B1* | 10/2016 | Gold | | B60J 5/04 |
| 9,758,090 B1* | 9/2017 | Salter | | B60Q 1/323 |
| 2002/0113458 A1* | 8/2002 | Heiland | | B60J 11/08 |
| | | | | 296/136.01 |
| 2004/0033716 A1* | 2/2004 | Musolf | | H01R 13/641 |
| | | | | 439/490 |
| 2007/0247834 A1* | 10/2007 | Turner | | A41D 13/01 |
| | | | | 362/103 |
| 2009/0051517 A1* | 2/2009 | Suzuki | | B60Q 1/323 |
| | | | | 340/438 |
| 2009/0129105 A1* | 5/2009 | Kusu | | B60Q 3/80 |
| | | | | 362/464 |
| 2011/0037395 A1* | 2/2011 | Kao | | B60K 16/00 |
| | | | | 315/150 |
| 2012/0032463 A1* | 2/2012 | Gerndorf | | B60R 11/0235 |
| | | | | 296/1.08 |
| 2013/0057160 A1* | 3/2013 | Adams | | H05B 33/0845 |
| | | | | 315/160 |
| 2013/0091770 A1* | 4/2013 | Chen | | E05F 15/43 |
| | | | | 49/28 |
| 2013/0161980 A1* | 6/2013 | Suzuki | | B62D 25/04 |
| | | | | 296/202 |
| 2014/0028058 A1* | 1/2014 | Mochizuki | | B62D 25/02 |
| | | | | 296/193.08 |
| 2014/0049977 A1* | 2/2014 | Gold | | B60J 5/0402 |
| | | | | 362/549 |
| 2015/0102623 A1* | 4/2015 | Watanabe | | B62D 25/04 |
| | | | | 296/30 |
| 2015/0138818 A1* | 5/2015 | Salter | | H05B 47/105 |
| | | | | 362/510 |
| 2015/0183306 A1* | 7/2015 | Shimizu | | B60J 5/0411 |
| | | | | 296/146.6 |
| 2015/0218870 A1* | 8/2015 | Fukui | | B60R 25/20 |
| | | | | 701/49 |
| 2015/0291084 A1* | 10/2015 | Gold | | B60Q 1/323 |
| | | | | 362/516 |
| 2016/0047147 A1* | 2/2016 | James | | E05C 17/025 |
| | | | | 292/194 |
| 2016/0195430 A1* | 7/2016 | Sticherling | | B60R 25/2054 |
| | | | | 250/349 |
| 2016/0257244 A1* | 9/2016 | Oliverio | | F21S 43/237 |
| 2017/0008449 A1* | 1/2017 | Wittorf | | B60Q 1/24 |
| 2017/0210282 A1* | 7/2017 | Rodriguez Barros | . | B60Q 1/484 |
| 2017/0267290 A1* | 9/2017 | Ayuzawa | | B62D 25/04 |
| 2017/0327036 A1* | 11/2017 | Johnson | | B60Q 1/50 |
| 2018/0065681 A1* | 3/2018 | Steffens | | B62D 29/005 |
| 2018/0072225 A1* | 3/2018 | Chen | | B60Q 1/2661 |
| 2018/0326899 A1* | 11/2018 | Salter | | B60Q 3/54 |
| 2018/0345791 A1* | 12/2018 | Hallack | | B60K 35/00 |
| 2019/0256154 A1* | 8/2019 | Kamimura | | B62D 25/04 |
| 2019/0309564 A1* | 10/2019 | Mitchell | | E05B 81/70 |

* cited by examiner

VEHICLE DOOR PILLAR LIGHT ASSEMBLY AND METHOD OF USE THEREOF

BACKGROUND OF THE INVENTION

Field of the Invention

The present invention is in the field of vehicle safety and accident avoidance assemblies. More particularly, the present invention is a vehicle door pillar light assembly and method of use thereof, which is used to create an area of illumination that increases the conspicuity of a vehicle's open door, door frame, door window frame, road adjacent the opened door, and/or objects, such as people, located adjacent to and rearward of the opened vehicle door.

Brief Description of the Prior Art

Conventional vehicle body frames are typically provided with several pairs of corresponding laterally spaced, essentially vertically-extending pillar structures. These classically include a forward-most pair of pillar structures constituting the "A" pillars, one or more pairs of intermediate pillar structures (typically the "B" pillars), and a pair of rearward-most pillar structures (usually the "C" and/or "D" pillars). In other words, the pillars are the vertical or near vertical supports of a car which are designated respectively as the A-pillar, B-pillar, C-pillar, or in larger cars the D-pillar, when moving from the front to the rear of the vehicle, in a side elevation view. U.S. Pat. No. 6,092,865 discloses an example of a space frame structure for a vehicle and describes such pillars. It can be appreciated that the exact structure and configuration of various vehicles differ, and the above description is an example of one of such vehicle frame configurations. It can be appreciated that the present invention is applicable to and can be modified for installation in a wide variety of vehicle structures and configurations.

Conventional vehicles also include doors that are typically mounted on both sides of the vehicle frame for movement between a closed position and various degrees of open positions. In most vehicles, each vehicle door is mounted on one of the pillar structures by a pair of hinges that allow for pivotal movement of the door between the open and closed positions. In the closed position, each door is received in a door frame defined by adjacent pillar structures on the vehicle's frame in conjunction with a lower sill and an upper roof rail.

More particularly, by way of example, in the case of the "B" (or center) pillar on a four-door sedan, the pillar is typically a closed steel structure that is welded at the bottom to the car's rocker panel, sill, and floorpan and on the top to the vehicle's roof rail or panel. This pillar provides structural support for the vehicle's roof panel and is designed for latching the front door which is hingedly attached to the A-pillar and for mounting the hinges for the rear door. In a sedan, the B-pillar in conjunction with the A-pillar, sill, and roof rail define a door frame for the vehicle's front door. Similarly, in a conventional sedan, the B-pillar in conjunction with the C-pillar, sill, and roof rail, define a door frame for the vehicle's rear door.

A conventional car door is a type of door, typically hinged, but sometimes attached by other mechanisms such as tracks, in front of the door frame opening defined in the vehicle's frame which is used for entering and exiting the vehicle. Most doors include door switches which are mechanisms typically connected to the interior lights (such as the dome light), and may also be connected to a warning light, speaker, and/or other device, which detect and inform the driver when the door is not closed. Often, these switches are located in the door jamb or along the door frame. In newer vehicles, the door switches are incorporated into the door latch mechanism. While the exact structure and configuration of these switches differs, they are commonly electrically connected to the vehicle's electrical system and indicate whether the vehicle door is open or closed.

Since most vehicle doors open outwardly, the doors may pose as a hazard to passers-by, whether it is another vehicle, bicycle, motorcycle or pedestrian, for example, or even the person entering or exiting the vehicle. This is especially so at night where another driver or bicycle rider may not be able to see a vehicle's open door or a person in front of it, until they are too close to the car and, therefore, unable to stop in time to avoid striking the car and/or person.

Certain of the inventor's prior patents relate to increasing the conspicuity of various portions of a vehicle's door, door frame, and window frame. Particularly, the inventor's prior U.S. Pat. Nos. 8,382,350, 8,596,840, 8,894,256, 9,108,569, 9,308,859, and 9,469,246, which are incorporated herein by reference, all disclose the application of a highly reflective luminant component to various portions of a vehicle, such as the window trim, door, and/or door frame to illuminate the vehicle (see, FIG. 1). The safety benefits of such retroreflective luminant components applied to a portion of the vehicle door frame, lower door flange, and/or window frame are set forth in the inventor's Petition for Rulemaking dated Mar. 11, 2019 to the National Highway Traffic Safety Administration, provided at inviewvehicletrim.com, which is incorporated herein by reference.

However, in the inventor's aforementioned patents, the luminant components are illuminated when a light exterior of the vehicle is directed at the luminant components, such as the headlights from another vehicle. However, in certain situations, the headlights of the vehicle approaching the vehicle with the opened door, may not illuminate the luminant components until the vehicle is too close to stop and avoid striking the car. In other situations, there may not be an external light to illuminate the luminant components, such as when a bicycle is approaching a vehicle having an opened door.

Thus, the present invention seeks to improve upon these patents by teaching a new location for providing a light on a vehicle, namely, on the vehicle door pillar, in order to illuminate the car door and door frame and, in turn, illuminate the luminant components affixed to the vehicle. Even in the absence of luminant components on the vehicle, the light assembly according to the present invention, illuminates the interior side of the vehicle's door, a portion of the door frame, and a portion of the road adjacent the vehicle door, to alert others to an open door and the possibility of a person entering or exiting the vehicle.

It is well known to provide various lights within the interior of a car. However, so far as is known, no prior art assemblies provide lights on the door pillars to illuminate the interior side of the door and door frame. Thus, while the prior art discloses many different types of illuminating devices and assemblies, so far as is known, none of the prior art devices resolve all these problems in a simple, effective, and yet highly advantageous manner as in the present invention discussed herein.

SUMMARY OF THE INVENTION

It is therefore an object of the present invention to provide a novel vehicle light assembly and method of use thereof for warning drivers, riders, and passers-by of vehicles.

It is another object of the present invention to provide a novel light assembly and method of use thereof that increases the conspicuity and visibility of the vehicle's door to other drivers, riders, and passers-by, at a greater distance.

It is yet another object of the present invention to provide novel light assembly and method of use thereof that illuminates at least the vehicle door and any objects disposed between the opened door and the light source, such as passengers entering or exiting the vehicle.

It is also an object of the present invention to provide a novel light assembly and method of use thereof that creates an area of illumination that illuminates the vehicle door, at least a portion of the vehicle door frame, and/or the road adjacent to the opened door.

It is a further object of the present invention to provide a novel light assembly and method of use thereof that is incorporated into the A-pillars, B-pillars, and/or C-pillars of the vehicle.

It is yet another object of the present invention to provide a novel light assembly and method of use thereof that works in conjunction with the prior art luminant components applied to the vehicle door and door frame, to illuminate the luminant components even in the absence of a light source external of the vehicle.

Certain of the foregoing and related objects are readily attained according to the present invention by the provision of a vehicle door pillar light assembly for illuminating a vehicle door, comprising a vehicle body having a vehicle door frame defining an opening therebetween for entering and exiting a vehicle; a vehicle door hingedly connected to said vehicle door frame and moveable between a range of degrees of open positions and a closed position; means for detecting whether said vehicle door is in said open positions or said closed position; and a light source mounted within said vehicle door pillar, said light source being electrically connected to said means for detecting, wherein said light source is illuminated when said vehicle door is in said open positions and unilluminated when said vehicle door is in said closed position.

Advantageously, said vehicle door frame comprises a generally upright rear pillar and said light source is disposed on said rear pillar of said vehicle door frame, to illuminate said vehicle door and objects disposed between said light source and said vehicle door, when said vehicle door is in said open positions. Moreover, it is preferred that said rear pillar is the vehicle B-pillar and/or said rear pillar is the vehicle C-pillar.

Desirably, a portion of said rear pillar comprises a forward-facing mounting surface generally facing towards the front of the vehicle, and wherein said light source is mounted within said forward-facing mounting surface, to emit light towards the front of the vehicle. Preferably, said light source is mounted on said mounting surface of said vehicle door frame at a position which is angled to emit light towards the front and the exterior of the vehicle. It is also preferred that said light source is positioned on said vehicle door frame to illuminate said vehicle door and at least a portion of said vehicle door frame.

In a preferred embodiment, said rear pillar has an upper half and a lower half, and said light source is mounted within said lower half of said rear pillar. It is also preferred that said means for detecting is a door switch mounted on a member selected from the group consisting of said vehicle door frame and said vehicle door. Advantageously, said light source is mounted flush with a surface of said vehicle door frame. It is also advantageous that said light source is at least one LED light.

In one embodiment, said light source comprises a strobe setting and a non-flashing steady setting. Preferably, said light source is electrically connected to an electrical system of the vehicle. It is also preferred that said vehicle door frame defines an opening therein for receiving said light source.

In one preferred embodiment, said vehicle door frame comprises a generally upright front pillar and wherein said light source is disposed on said front pillar of said vehicle door frame; and wherein said vehicle door further comprises an interior side edge hingedly connected to said vehicle door frame, an opposite exterior side edge, and an interior side; wherein a first transparent panel is disposed on said interior side edge of said vehicle door adjacent to said light source and at least one second transparent panel is disposed on a member selected from the group consisting of said exterior side edge of said door, opposite from said first transparent panel, and said interior side of said door; and wherein when said door is in said open position, light from said light source is directed through said first transparent panel and is visible on through said at least one second transparent panel.

Certain of the foregoing and related objects are also readily attained according to the present invention by the provision of a lighting device for installation on a door frame of a vehicle, the vehicle having an electrical system, a vehicle body having a door frame defining an opening therebetween for entering and exiting the vehicle, a vehicle door hingedly connected to the vehicle door frame and moveable between a range of degrees of open positions and a closed position, and means for detecting whether the door is in the open positions or the closed position, comprising: a light source configured and dimensioned to be mounted within the vehicle door frame; and means for electrically connecting said light source to the electrical system of the vehicle and the means for detecting whether the door is in the open positions or the closed position, wherein said light source is illuminated when the vehicle door is in the open positions and unilluminated when the vehicle door is in the closed position.

In addition, certain of the foregoing and related objects are also readily attained according to the present invention by the provision of a method of warning drivers of vehicles, the method comprising the steps of: providing a vehicle having an electrical system, a vehicle body having a vehicle door frame defining an opening therebetween for entering and exiting said vehicle, a vehicle door hingedly connected to said vehicle door frame, wherein said door is moveable between a range of degrees of open positions and a closed position, and means for detecting whether said vehicle door is in said open positions or said closed position; providing a light source having means for electrically connecting said light source to said electrical system of said vehicle and said means for detecting whether said vehicle door is in said open positions or said closed position; installing said light source in said vehicle door frame by mounting said light source in said vehicle door frame; electrically connecting said light source to said electrical system of said vehicle and said means for detecting, such that said light source is illuminated when said vehicle door is in said open positions and unilluminated when said vehicle door is in said closed position; and opening said vehicle door to illuminate said light source.

Preferably, said light source comprises a strobe setting and a non-flashing steady setting; and wherein said light source is in said strobe setting for a predetermined period of time upon initially opening said vehicle door and switches to said steady setting after said predetermined period of time.

It is also preferred that said vehicle door frame comprises a generally upright rear pillar having a forward-facing mounting surface generally facing towards the front of the vehicle; and wherein said light source is mounted within said forward-facing mounting surface, to illuminate said vehicle door and objects disposed between said light source and said vehicle door, when said door is in said open positions.

Advantageously, said light source is mounted on said mounting surface of said vehicle door frame at a position which is angled to emit light towards the front and the exterior of the vehicle.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 3:
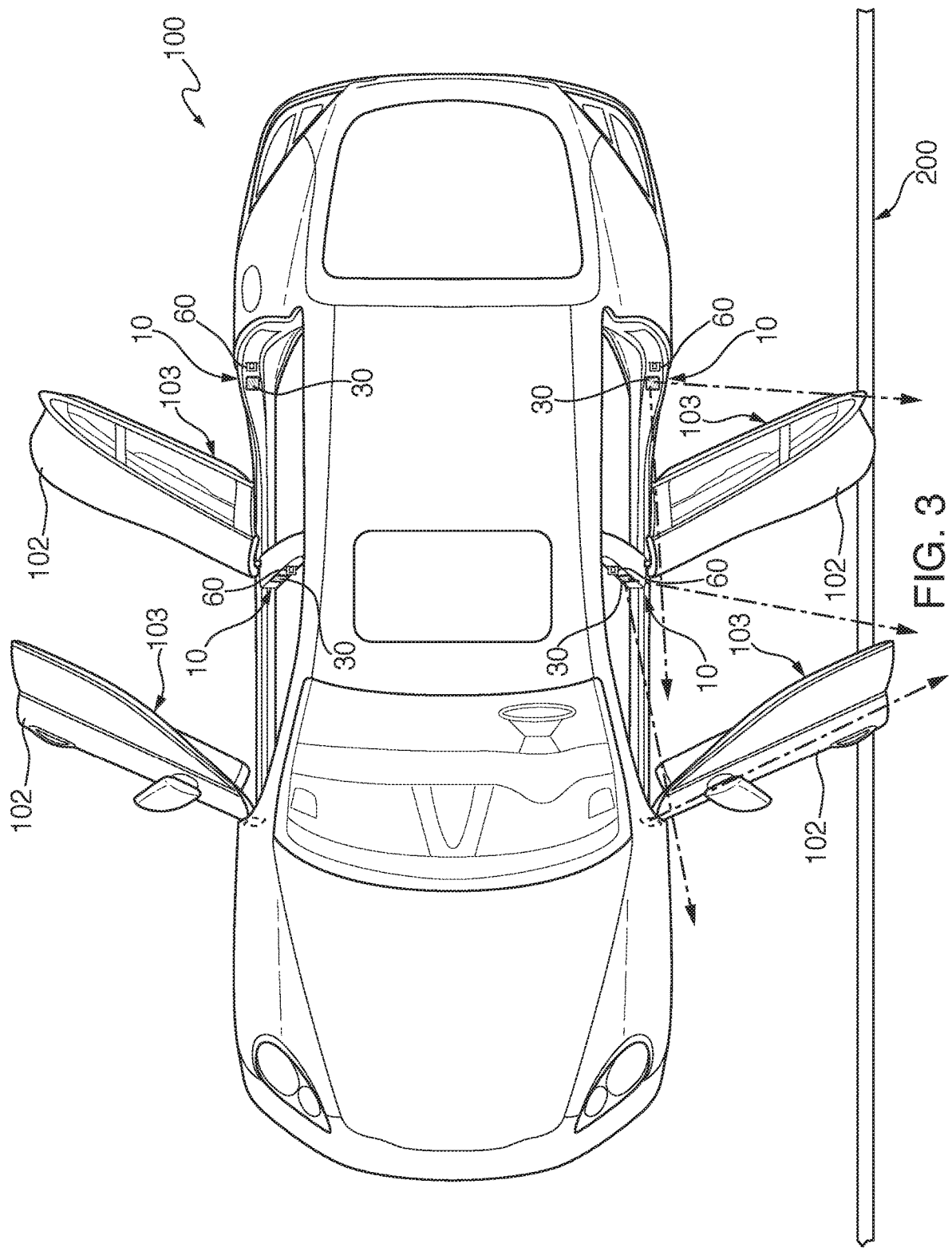
FIG. 3 is a top plan view of a vehicle with its doors open, showing the areas illuminated by the light assemblies of the present invention on the driver's side of the vehicle.
Figure 4:
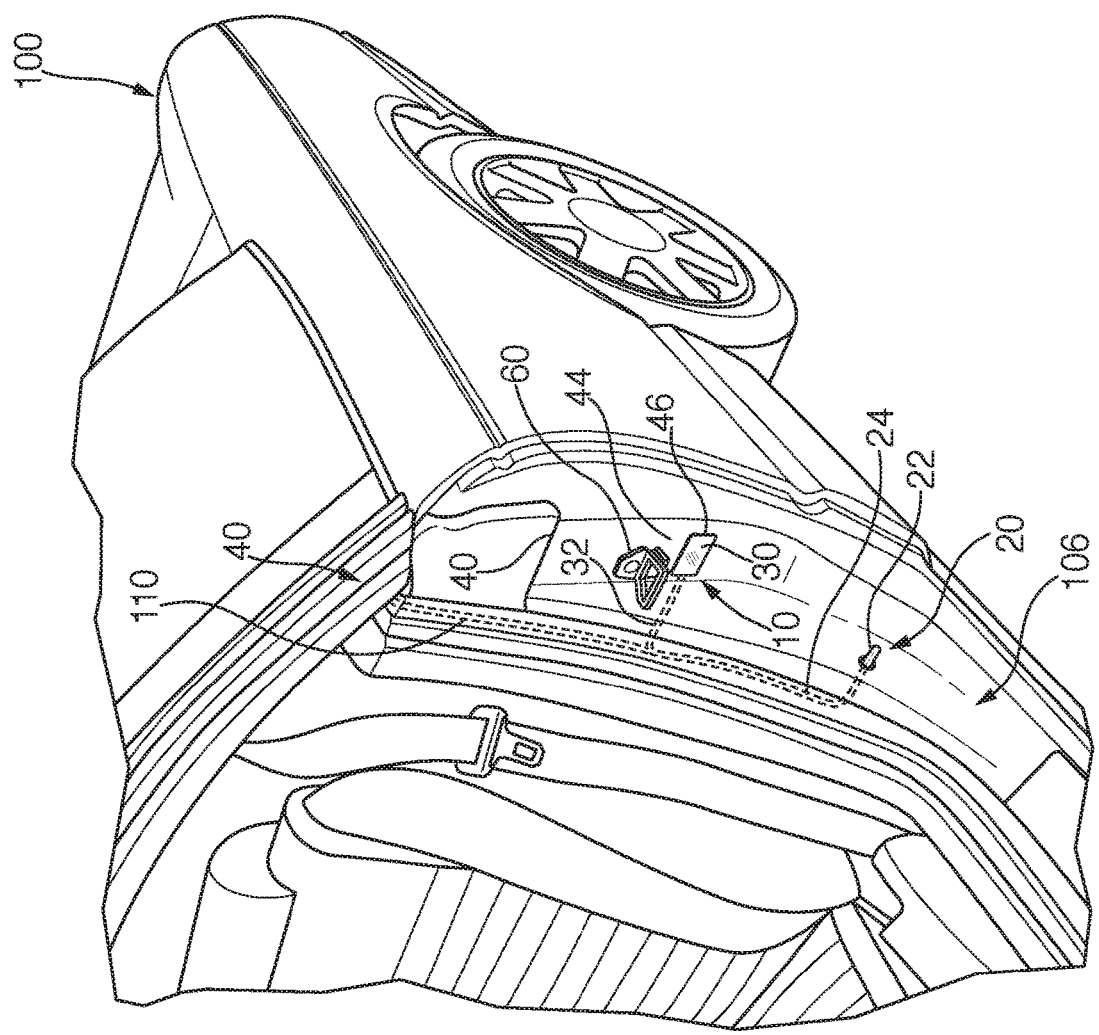
FIG. 4 is a close-up view of a light assembly mounted on the vehicle door pillar and connected to a door switch and the vehicle's electrical system.

Turning now in detail to the drawings, and particularly to FIG. 4, which illustrates the vehicle door pillar light assembly, according to the present invention, generally designated by reference numeral 10. As seen best in FIG. 3, vehicle door pillar light assemblies 10 are installed within a vehicle 100 as an accident minimizing safety measure, by creating an area of illumination which encompasses doors 102 when opened, portions of door frame 106, as well as any objects, such as people, that are disposed in between door 102 and light assembly 10, to increase their conspicuity to other vehicles and passers-by. The light assemblies 10 also work in conjunction with the prior art highly reflective luminant components 18 which may be affixed to the vehicle 100 within the area illuminated by assemblies 10, such as the vehicle door, door window frame, and/or door frame, to increase the conspicuity of the vehicle at a greater distance as well as in the absence of an external light source. Additionally, light assemblies 10 illuminate a portion of the road 200, having the dual purpose of providing the passengers with light as they enter or exit the vehicle as well as increasing the conspicuity of those persons to others.

Figure 1:
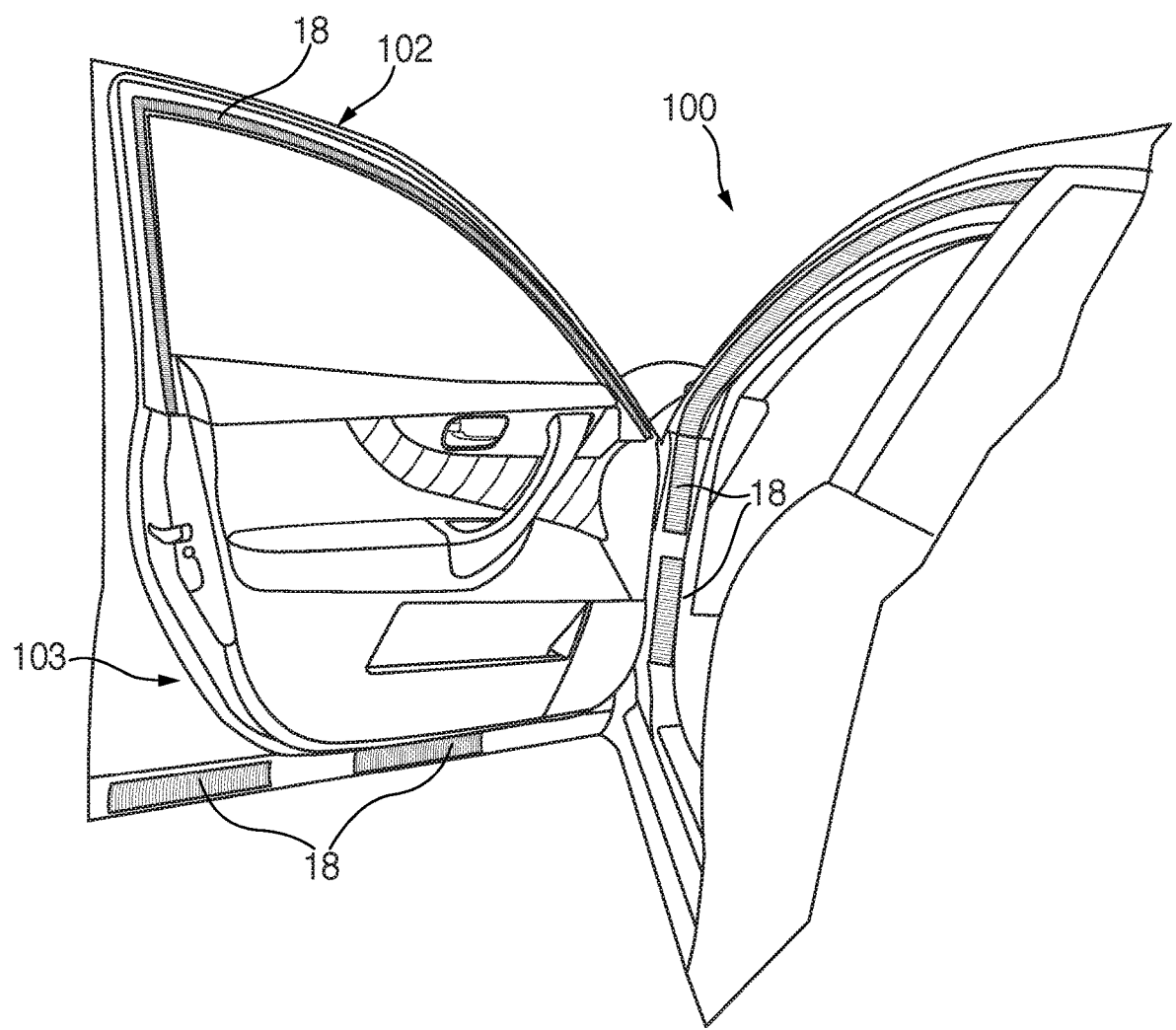
FIG. 1 is an illustration of a prior art vehicle door and door frame, having highly reflective luminant components applied to the motor vehicle door, door window frame, and door frame.
Figure 2:
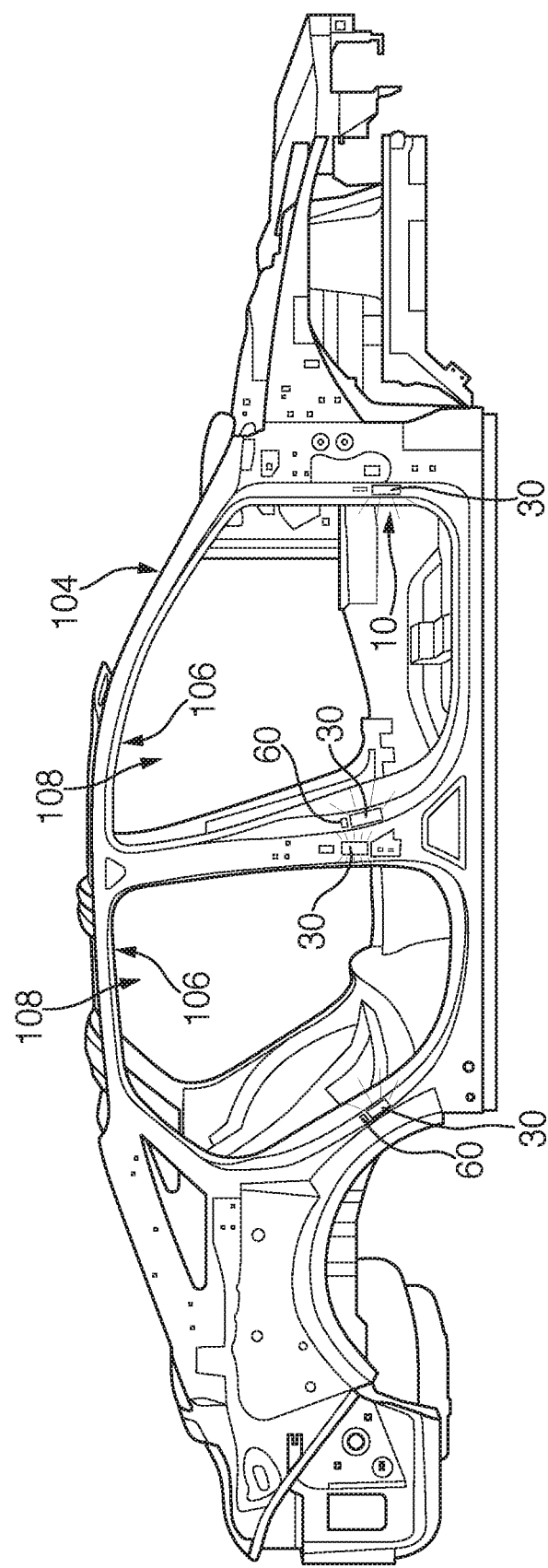
FIG. 2 is a side elevation view of a vehicle body frame defining four vehicle door frames having openings therein with the light assemblies, according to the present invention, mounted on the A-pillar, B-pillar, and C-pillars of the vehicle.
Figure 5:
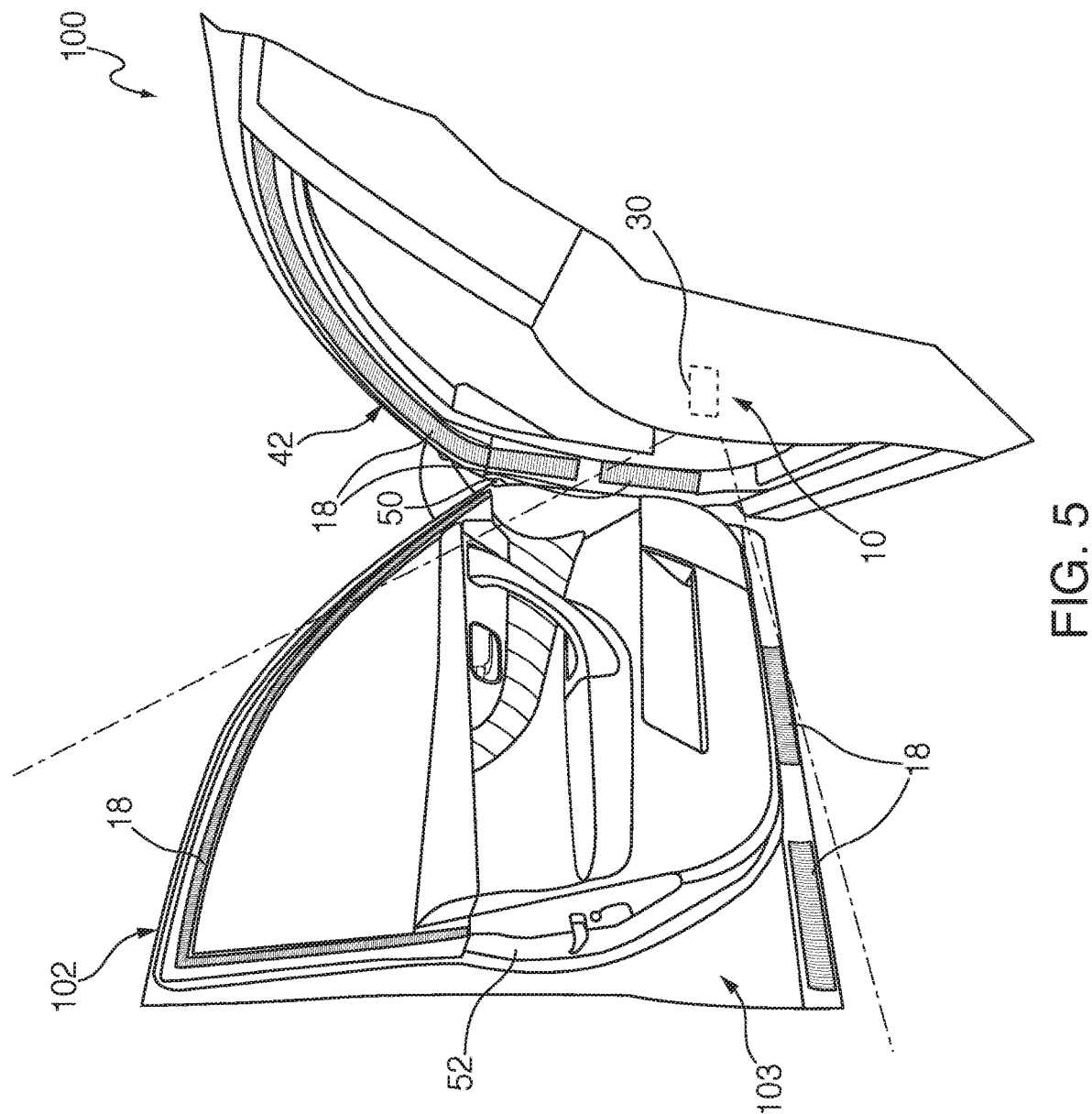
FIG. 5 is a view similar to FIG. 1, but showing the area the light assembly illuminates which encompasses the highly reflective luminant components on the vehicle door and door frame.
Figure 6:
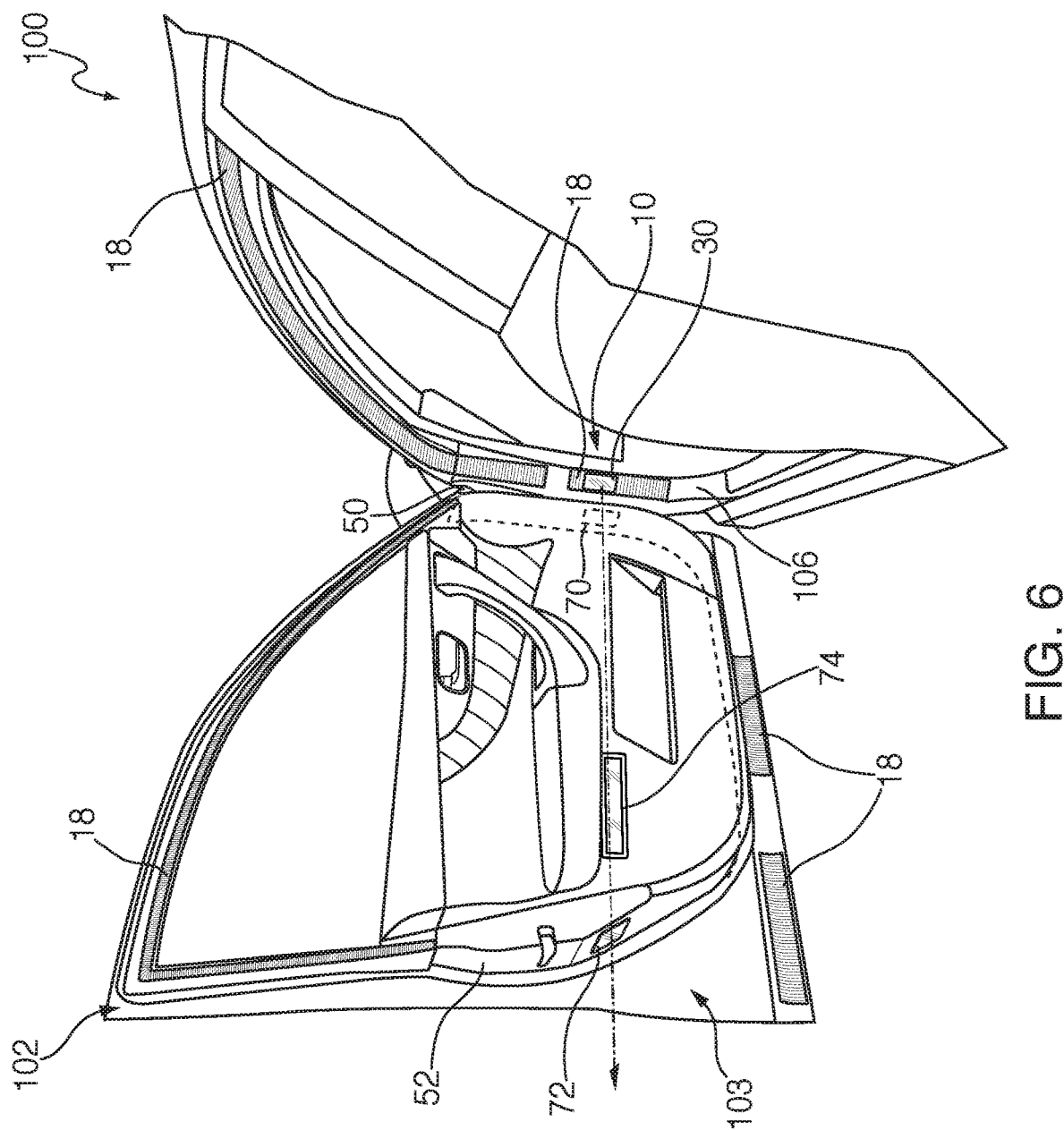
FIG. 6 is a view of an alternative embodiment of the present invention, showing a light assembly mounted on the front pillar and directing light into the hollow interior of the vehicle door and illuminating transparent panels on the door.

As seen best in FIGS. 2-3, a typical vehicle 100 includes a vehicle body 104 having at least one vehicle door frame 106 defining one or more door openings 108 for entering and exiting vehicle 100. A conventional vehicle door 102 is hingedly connected to vehicle door frame 106, adjacent to each of the door openings 108. The vehicle doors 102 is moveable between a range of degrees of open positions (as seen in FIGS. 3 and 5-6) and a closed position. As can be appreciated, the exact configuration and structure of the vehicle body, vehicle door frame, and vehicle doors, depends on the make and model of the vehicle. The present invention is universally adaptable to be used in conjunction with a wide variety of vehicle structures.

Turning to FIG. 4, conventional vehicles 100 typically include means for detecting whether each of the vehicle doors 102 are in the open positions or closed position. In certain vehicles, the means for detecting whether the vehicle doors 102 are open is a conventional door switch 20. A door switch 20, also referred to as a door jamb switch, a door jamb light switch, or a door ajar switch, are typically used to activate the interior dome lights (not shown) when one or more of the vehicle doors 102 are open. In newer cars, switches 20 may also signal the vehicle's computer if a door 102 is not closed completely, which in turn, activates the warning light signal and/or the door ajar warning alarm.

There are various locations where door switches 20 are commonly installed in vehicles and the precise functioning of these switches can vary according to the make and model of the vehicle. Certain door ajar switches are located in the front of the door frame 106, adjacent the hinge side of the door 102. These switches 20 are manually pressed when door 102 is opened and are released when door 102 is closed. Other switches are located on the rear door jamb or exterior side edge of the door. Switches of this type are pressed in when door 102 is closed and released when door 102 is opened. Other door ajar switches 20 are not found in the door frame 106 but are incorporated into the door latch mechanism 60. No matter where door switch 20 is located or its configuration, it detects whether one of the vehicle doors 102 are opened or closed. The present invention encompasses the various structures, configurations, and locations of door switches 20 so long as switches 20 can detect when a vehicle door 102 is opened or closed.

One such embodiment of the placement and structure of a door switch 20 is illustrated in FIG. 4. Particularly, in the embodiment shown in FIG. 4, switch 20 is mounted on the vehicle door frame 106 and includes a manually depressible button 22. In FIG. 4, when door 102 is closed, button 22 is manually pressed inwardly, to signal that door 102 is closed. When door 102 is opened, button 22 is released, to signal that door 102 is opened. Door switch 20 is connected to the vehicle's electrical system 110 via wiring to activate certain devices within the vehicle 100 when the door is opened, such as the vehicle's interior lights, dashboard light, and/or door ajar warning signal. In an alternate embodiment of the present invention, door switch 20 is incorporated into latch 60 on door 102. The embodiments described and illustrated are merely examples of door switches 20 and the present invention is not limited thereto. The present invention contemplates various structures and placements of door switches 20, so long as they operate to signal whether the vehicle door is open or closed.

The assembly 10, according to the present invention, also includes a light source 30 mounted within vehicle door frame 106. Light 30 is electrically connected to door switch 20 by wiring 24 as well as the electrical system of the vehicle 110, so that light 30 is illuminated when one or more vehicle doors 102 are opened and unilluminated when the vehicle doors 102 are closed. As seen best in FIGS. 2 and 4, each light source 30 is positioned on a location on vehicle door frame 106 to create an area of illumination which encompasses the interior side 103 of adjacent vehicle door 102 and a portion of door frame 106. The area that is illuminated by light 30 also includes any objects, such as persons entering or exiting the vehicle 100, which are disposed between light 30 and interior side 103 of door 102, when a door 102 is in an open position. Additionally, light 30 illuminates a portion of the road 200, which as mentioned above, provides passengers with light as they enter or exit the vehicle as well as increasing the conspicuity of those persons to others.

More particularly, as seen in FIGS. 2 and 4, each conventional vehicle door frame 106 includes a generally upright rear pillar 40, such as the B-pillar in the case of the front door openings, or C-pillar in the case of the rear door openings (see, FIG. 4). A vehicle door frame may also include a generally upright front pillar 42, such as the A-pillar in the case of the front door openings or the B-pillar in the case of the rear door openings (see, FIG. 4). According to one embodiment of the present invention, as seen in FIG. 2, lights 30 are is mounted on the A-pillar, B-pillar, and/or C-pillars on each side of vehicle 100. According to another embodiment, two light assemblies 30 may be mounted on the B-pillar.

According to the embodiment illustrated in FIG. 4, a portion of rear pillar 40 is a forward-facing mounting surface 44 facing towards the front of the vehicle 100 and the interior side 103 of an opened door 102. In this preferred embodiment, light 30 is mounted on forward-facing mounting surface 44, to emit light towards the front of the vehicle as well as the interior side 103 of an opened door 102. It is preferable that light 30 is mounted on mounting surface 44 at a position which is angled to emit light towards the front and the exterior of the vehicle, so as to illuminate a portion of door frame 106, door 102, and a portion of road 200, adjacent to opened door 102. The preferred placement of light 30 is on the lower half of rear pillar 40 and mounted flush with mounting surface 44, within an opening 46 formed therein. More particularly, the preferred placement of light 30 is adjacent to and beneath door latch 60.

As mentioned above, light 30 is connected via wiring 24 to switch 20, so that light 30 is illuminated when door 102 is open and unilluminated when door 102 is closed. Light 30 is also electrically connected to electrical system 110 of the vehicle, via wiring 32, as seen in FIG. 4. Since the precise wiring of the electrical systems in vehicles varies according to the make and the model of the vehicle, the precise electrical connections according to the present invention can vary and would be well known to those having ordinary skill in the art. It is preferred that light source 30 is at least one LED light. Light 30 may also include a strobe setting and/or a non-flashing steady setting.

In another embodiment of the present invention, as seen in FIGS. 2-3 and 6, light source 30 is disposed on a front pillar 42 of the vehicle door frame 106. In other words, light 30 is mounted to the same pillar to which the door 102 is hingedly connected, such as the A-pillar for the front doors and/or the B-pillar for the rear doors. More particularly, as illustrated best in FIG. 6, vehicle door 102 includes an interior side edge 50 which is hingedly connected to front pillar 42 of vehicle door frame 106, and an opposite exterior side edge 52. The door 102 includes a first transparent panel 70 which is disposed on interior side edge 50 of door 102 adjacent to light source 30. As seen in FIG. 6, a second transparent panel 72 is disposed on exterior side edge 52 of door 102. Panel 72 is located directly opposite from first transparent panel. The door 102 may also include one or more transparent panels 74 on the interior side 103 of door 102. Conventional vehicle doors define a hollow space in the interior of the door 102. When door 102 is in an open position, light from light source 30 is directed through first panel 70 into the hollow interior space of the vehicle door 102 and the light is visible through panels 72 and 74.

The assembly 10 of the present invention is utilized as a safety measure to alert others, including other drivers, that a vehicle door 102 is ajar. The present invention also works in conjunction with the prior art assemblies that include highly reflective luminant components 18 on the door, door frame, and/or window frame. Particularly, light assembly 10 of the present invention is activated by switch 20, to illuminate light 30 when a door 102 is opened. When light assembly 10 is mounted on one or more rear pillars 40 of door frames 106, light 30 emits light that is projected towards the front of the vehicle 100, to create an area of illumination that illuminates the interior side 103 of door 102, a portion of door frames 106, a portion of road 200 disposed adjacent to door 102, as well as any other object, such as people entering or exiting the vehicle 100 that are disposed between door 102 and light 30. In the preferred embodiment, the area illuminated by light 30 includes the entire interior side 103 of doors 102.

In a preferred embodiment of the present invention, light source 30 includes both a strobe setting and a steady non-flashing setting. The light assembly 10 can alert drivers as to the opening of a vehicle door 102, by assuming the strobe setting for a predetermined period of time upon initially opening the vehicle door and switches to the steady non-flashing setting after that period of time.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A vehicle door pillar light assembly for illuminating a vehicle door, comprising:
   a vehicle body having a vehicle door frame defining an opening therebetween for entering and exiting a vehicle, wherein said vehicle door frame comprises a generally upright rear pillar and a generally upright front pillar, wherein said rear pillar of said vehicle door frame comprises an exterior side having a mounting surface generally facing towards the exterior of the vehicle;
   a vehicle door hingedly connected to said front pillar of said vehicle door frame and moveable between a range of degrees of open positions and a closed position, wherein said vehicle door further comprises an interior side and a lower edge;
   means for detecting whether said vehicle door is in said open positions or said closed position; and
   a light source mounted on said exterior-facing mounting surface of said rear pillar of said vehicle door frame at a position which is angled towards said vehicle door, said light source being electrically connected to said means for detecting, wherein said light source is illuminated when said vehicle door is in said open positions and unilluminated when said vehicle door is in said closed position and wherein when said vehicle door is in said open position, said light source projects light towards said opened vehicle door and is configured and dimensioned to create an area of illumination which illuminates the entirety of said interior side of said opened vehicle door and objects disposed between said light source and said interior side of said opened vehicle door, to increase the conspicuity of said opened vehicle door and the objects disposed between said light source and said interior side of said opened vehicle door.

2. The assembly according to claim 1, wherein:
said rear pillar is a B-pillar of the vehicle.

3. The assembly according to claim 1, wherein:
said rear pillar is a C-pillar of the vehicle.

4. The assembly according to claim 1, wherein:
said light source is positioned on said vehicle door frame to illuminate said opened vehicle door and at least a portion of said vehicle door frame.

5. The assembly according to claim 1, wherein:
said rear pillar has an upper half and a lower half, and said light source is mounted within said lower half of said rear pillar.

6. The assembly according to claim 1, wherein:
said means for detecting is a door switch mounted on a member selected from the group consisting of said vehicle door frame and said vehicle door.

7. The assembly according to claim 1, wherein:
said light source is mounted flush with a surface of said vehicle door frame.

8. The assembly according to claim 1, wherein:
said light source is at least one LED light.

9. The assembly according to claim 1, wherein:
said light source comprises a strobe setting and a non-flashing steady setting.

10. The assembly according to claim 1, wherein:
said light source is electrically connected to an electrical system of the vehicle.

11. The assembly according to claim 1, wherein:
said vehicle door frame defines an opening therein for receiving said light source.

12. A vehicle door pillar light assembly for illuminating a vehicle door, comprising:
a vehicle body having a vehicle door frame defining an opening therebetween for entering and exiting a vehicle, wherein said vehicle door frame comprises a generally upright rear pillar and a generally upright front pillar;
a vehicle door hingedly connected to said front pillar of said vehicle door frame and moveable between a range of degrees of open positions and a closed position;
means for detecting whether said vehicle door is in said open positions or said closed position; and
a light source mounted on said front pillar of said vehicle door frame, said light source being electrically connected to said means for detecting, wherein said light source is illuminated when said vehicle door is in said open positions and unilluminated when said vehicle door is in said closed position;
wherein said vehicle door further comprises an interior side edge hingedly connected to said vehicle door frame, an exterior side edge which is disposed opposite from said interior side edge, an interior side, an exterior side, and a hollow interior cavity defined therebetween;
wherein a first transparent panel is mounted on said interior side edge of said vehicle door adjacent to said light source which is mounted on said front pillar of said vehicle door frame and wherein at least one second transparent panel is mounted on a member selected from the group consisting of said exterior side edge of said vehicle door and said interior side of said vehicle door;
and wherein when said door is in said open position, said light source projects light towards and through said first transparent panel on said interior side edge of said vehicle door, into said hollow interior cavity of said vehicle door, and the light is projected outwardly from said vehicle door through said at least one second transparent panel disposed on said vehicle door.

13. A method of warning drivers of vehicles, the method comprising the steps of:
a) providing a vehicle having an electrical system, a vehicle body having a vehicle door frame defining an opening therebetween for entering and exiting said vehicle, wherein said vehicle door frame comprises a generally upright rear pillar and a generally upright front pillar, wherein said rear pillar of said vehicle door frame comprises an exterior side having a mounting surface generally facing towards the exterior of said vehicle, a vehicle door hingedly connected to said front pillar of said vehicle door frame, wherein said door is moveable between a range of degrees of open positions and a closed position, and wherein said vehicle door further comprises an interior side and a lower edge, and means for detecting whether said vehicle door is in said open positions or said closed position;
b) providing a light source having means for electrically connecting said light source to said electrical system of said vehicle and said means for detecting whether said vehicle door is in said open positions or said closed position;
c) installing said light source in said vehicle door frame by mounting said light source on said exterior-facing mounting surface of said rear pillar of said vehicle door frame at a position which is angled towards said vehicle door;
d) electrically connecting said light source to said electrical system of said vehicle and said means for detecting, such that said light source is illuminated when said vehicle door is in said open positions and unilluminated when said vehicle door is in said closed position;
e) opening said vehicle door to illuminate said light source, wherein said light source projects light towards said opened vehicle door and creates an area of illumination which illuminates the entirety of said interior side of said opened vehicle door and objects disposed between said light source and said interior side of said opened vehicle door; and
f) illuminating with said light source the entirety of said interior side of said opened vehicle door and objects disposed between said light source and said interior side of said opened vehicle door, to increase the conspicuity of said opened vehicle door and the objects disposed between said light source and said opened vehicle door.

14. The method of warning drivers of vehicles according to claim 13, wherein:
said light source comprises a strobe setting and a non-flashing steady setting;
and wherein said light source is in said strobe setting for a predetermined period of time upon initially opening said vehicle door and switches to said steady setting after said predetermined period of time.

15. The method of warning drivers of vehicles according to claim 13, further comprising:

providing a highly reflective luminant component on said interior side of said vehicle door and illuminating said highly reflective luminant component with said light source.

\* \* \* \* \*